United States Patent [19]

Becker et al.

[11] Patent Number: 4,693,791

[45] Date of Patent: Sep. 15, 1987

[54] METHOD FOR PRODUCING SPINNING NOZZLE PLATES

[75] Inventors: Erwin Becker; Wolfgang Ehrfeld, both of Karlsruhe; Peter Hagmann, Leopoldshafen, all of Fed. Rep. of Germany

[73] Assignee: Kernforschungszentrum Karlsruhe GmbH, Karlsruhe, Fed. Rep. of Germany

[21] Appl. No.: 863,987

[22] Filed: May 16, 1986

[30] Foreign Application Priority Data

May 17, 1985 [DE] Fed. Rep. of Germany ....... 3517729

[51] Int. Cl.$^4$ ................................................. C25D 1/08
[52] U.S. Cl. ....................................................... 204/11
[58] Field of Search ............................................ 204/11

[56] References Cited

U.S. PATENT DOCUMENTS

| 3,167,489 | 1/1965 | Hadjian | 204/11 |
| 3,506,545 | 4/1970 | Garwin et al. | 204/15 |
| 3,512,247 | 5/1970 | Schaer et al. | 29/527.6 |
| 3,853,715 | 12/1974 | Romankiw | 204/15 |
| 4,404,060 | 9/1983 | Trausch | 156/632 |

FOREIGN PATENT DOCUMENTS 1261962  2/1972  United Kingdom .

*Primary Examiner*—T. M. Tufariello

*Attorney, Agent, or Firm*—Spencer & Frank

[57] ABSTRACT

A method for producing spinning nozzle plates having spinning nozzle channels employs a mold plate which contains mold channels corresponding to the spinning nozzle channels. The mold plate is initially connected with a galvanic electrode containing feed channels which communicate with the mold channels. Then negatives of the spinning nozzle channels are produced by filling the mold channels and the feed channels with an electrically insulating molding material and thereafter removing the mold plate, so that columns of molding material remain connected to the galvanic electrode. Finally, a galvanic layer enclosing the negatives of the spinning nozzle channels is produced, the galvanic layer is leveled, and the negatives as well as the remaining mold material are removed. The mold plate itself may be produced by depositing a layer of resist material on a further galvanic electrode, irradiating the resist layer in a predetermined pattern using high energy radiation, selectively removing portions of the irradiated resist layer to produce negatives that are connected to the further galvanic electrode, depositing a further galvanic layer, and removing the negatives. These techniques permit economical production of spinning nozzle plates, particularly plates having nozzle capillaries with specially shaped cross sections and small critical dimensions.

6 Claims, 9 Drawing Figures

METHOD FOR PRODUCING SPINNING NOZZLE PLATES

CROSS-REFERENCE TO RELATED APPLICATION

The subject matter of the present application is related in part to that of Applicants' copending application, Ser. No. 06/863,989 filed May 16th, 1986 (entitled METHOD FOR PRODUCING A SPINNING NOZZLE PLATE), the related application being assigned to the assignee of the present application.

BACKGROUND OF THE INVENTION

The present invention relates to a method for producing a spinning nozzle plate with the use of a mold plate, the spinning nozzle plate having spinning nozzle channels and the mold plate having mold channels which correspond to the spinning nozzle channels.

When fibers of organic or inorganic material are produced in large-scale industrial systems, the starting material is pressed, in a flowable state, through spinning nozzle plates which are equipped with a plurality of spinning nozzle channels. In most cases, the spinning nozzle channels are composed of nozzle capillaries through which the material to be spun is discharged and a significantly wider preliminary channel into which the material to be spun is fed. The preliminary channels are generally cylindrical or funnel-shaped, and can be produced relatively easily by drilling or piercing. The nozzle capillaries may have profiles of a special shape (for example, a star-shaped cross section) and require more complicated techniques, e.g. wire erosion or erosive countersinking. Nozzle capillaries with specially shaped, non-circular cross sections will hereafter be deemed "profiled" nozzle capillaries.

Spinning nozzle plates are parts which are subject to wear. Spinning nozzle plates having profiled nozzle capillaries, in particular, constitute a considerable cost factor during production of fiber products when the plates are produced in the prior art manner. Moreover, in the prior art manner of manufacturing profiled nozzle capillaries, the critical dimension limit that can be realized with justifiable expenditures generally lies at about 30 μm. This limits the configuration of the filaments that can be produced.

SUMMARY OF THE INVENTION

Based on this state of the art, it is an object of the present invention to provide a particularly economical method for the mass production of spinning nozzle plates, particularly those having profiled nozzle capillaries, in which the critical dimensions of the nozzle capillaries can be reduced, with acceptable costs, to values below the limits realizable with the prior art methods.

These and other objects are attained by a method wherein a mold plate having mold channels that correspond to the desired spinning nozzle channels is connected to a galvanic electrode having feed channels so that the mold channels communicate with the feed channels, negatives of the spinning nozzle channels are produced by filling the mold channels and feed channels with an electrically insulating molding material and subsequently removing the mold plate so that negatives connected to the galvanic electrode remain, a galvanic layer which encloses the negatives is produced, and then the negatives and the remaining molding material are removed. The mold plate itself is preferably produced by depositing resist material on a further galvanic electrode, irradiating the resist material in a predetermined pattern and thereafter selectively removing the resist material so that negatives of the mold channels remain, producing a further galvanic layer which encloses the negatives of the mold channels, and removing at least part of the further galvanic electrode.

DESCRIPTION OF THE PREFERRED EMBODIMENTS

Figure 1:
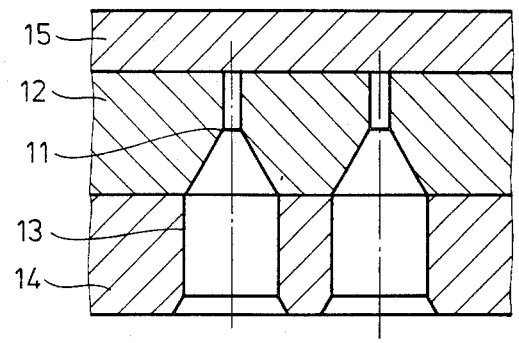
FIG. 1 is a cross-sectional view schematically illustrating a mold plate sandwiched between a galvanic electrode and a cover plate prior to introduction of electrically insulating molding material into alligned channels in the mold plate and galvanic electrode.
Figure 2:
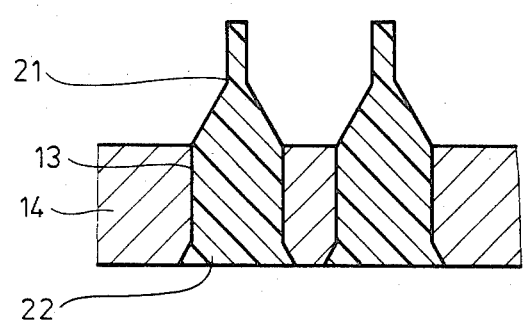
FIG. 2 is a cross-sectional view schematically illustrating columns of molding material that remain attached to the galvanic electrode after the mold plate and cover plate have been removed, the columns of molding material serving as negatives of the spinning nozzle channels.
Figure 3:
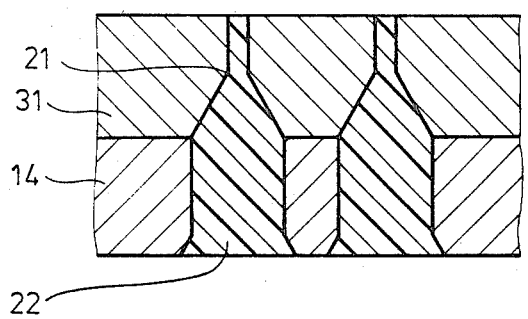
FIG. 3 is a cross-sectional view schematically illustrating the structure of FIG. 2 after a galvanic layer has been deposited.
Figure 4:
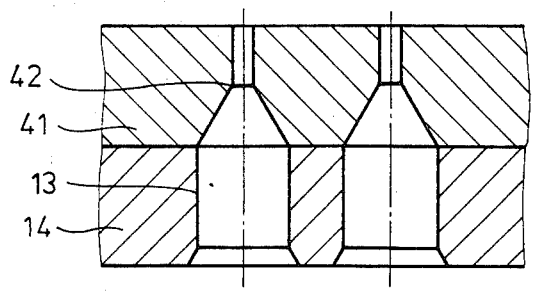
FIG. 4 is a cross-sectional view schematically illustrating a portion of the resulting spinning nozzle plate after the molding material has been removed from the structure of FIG. 3.

In FIG. 1, a mold plate 12 containing mold channels 11 corresponding to the spinning nozzle channels is combined with a galvanic electrode 14 containing feed channels 13 in such a manner that the mold channels 11 communicate with respective feed channels 13. The term "galvanic" as used herein means "electrically conductive." After closing mold channels 11 by means of a cover plate 15, mold channels 11 and feed channels 13 are filled jointly under vacuum with an electrically insulating molding material 22. After the molding material has solidified, cover plate 15 and mold plate 12 are removed, thus exposing negatives 21 (FIG. 2) of the spinning nozzle channels. Negatives 21 are connected, via the molding material 22 contained in feed channels 13, with galvanic electrode 14. In a galvanic bath, a galvanic layer 31 (FIG. 3) is produced on galvanic electrode 14. Galvanic layer 31 may be deposited by electroplating. As will be apparent from FIG. 3, layer 31 encloses the negatives 21 of the spinning nozzle channels to produce a flush surface. After galvanic layer 31 is leveled and after negatives 21 and the remainder of molding material 22 are removed, a spinning nozzle plate 41 with spinning nozzle channels 42 remains as shown in FIG. 4. Plate 41 is connected with galvanic electrode 14 which includes feed channels 13. No vacuum need be employed if the molding material is permitted to exit at the end of the nozzle capillaries and the excess molding material is removed.

In most cases, particularly if the spinning nozzle plate is to be subjected to high pressure forces in operation, galvanic electrode 14 is permitted to remain connected to spinning nozzle plate 41 as mechanical reinforcement, and the material to be spun is fed in through feed channels 13. Of course, galvanic electrode 14 can also be removed, e.g. by decomposing it, if it is made of a material which dissolves in or is chemically removed by an agent that does not attack spinning nozzle plate 41. The removal of galvanic electrode 14 is also possible without destroying the electrode by careful removal of spinning nozzle plate 41 from galvanic electrode 14, if the adhesive force of galvanic layer 31 has been reduced in a known manner by appropriate pretreatment, e.g. passivation of galvanic electrode 14.

To facilitate the destruction-free removal of the galvanic electrode 14, it is also possible to apply a thin layer (not illustrated) of an easily decomposed, electrically conductive material to the galvanic electrode 14, which layer is then decomposed to separate the galvanic electrode 14 from the spinning nozzle plate 41. Conversely, if necessary, the adhesion of the spinning nozzle plate 41 to the galvanic electrode 14 can be increased by means of a suitable pretreatment, e.g. activation, of the galvanic electrode 14.

The mold plate 12 employed in the method according to the invention can be produced with the techniques presently used for the production of spinning nozzle plates, for example by machining a metal plate to provide the spinning nozzle channels using wire erosion, erosive countersinking, and/or drilling. Since it is possible to produce numerous spinning nozzle plates with the aid of one mold plate, greater costs are acceptable for the manufacture of the mold plate than for the manufacture of the spinning nozzle plates. The prior art techniques can therefore be used in a more expensive manner, e.g. with thinner wires for the wire erosion process, or with finer electrodes for the erosive countersinking process. Thus the critical dimensions of the nozzle capillaries may be reduced to relatively small values, if small values are required and can be attained at an acceptable expense.

Figure 5:
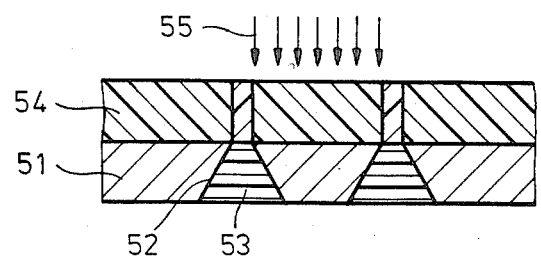
FIG. 5 is a cross-sectional view schematically illustrating a stage in the production of a mold plate that may be used as the mold plate in FIG. 1, and generally shows a layer of resist material that has been deposited onto a further galvanic electrode and that is irradiated in a predetermined pattern.
Figure 6:
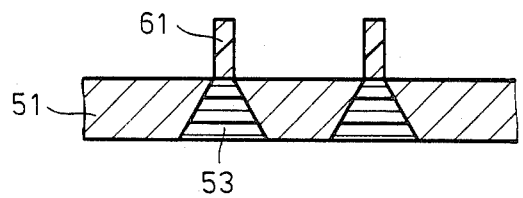
FIG. 6 is a cross-sectional view schematically illustrating the configuration of FIG. 5 after the irradiate resist layer has been selectively removed, thereby leaving columns of resist material which serve as negatives for the mold channels.
Figure 7:
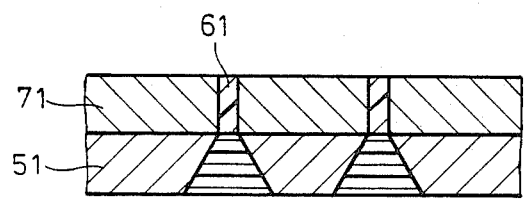
FIG. 7 is a cross-sectional view schematically illustrating the further galvanic electrode, negatives of the mold channels, and a further galvanic layer that has been deposited on the further galvanic electrode and around the negatives.
Figure 8:
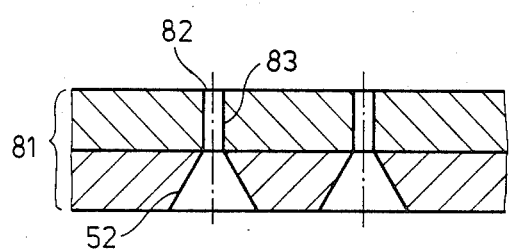
FIG. 8 is a cross-sectional view schematically illustrating the mold channels which remain after removal of the negatives and filler material from the configuration of FIG. 7.

If a mold plate must meet particularly high requirements with regard to the critical dimensions of the nozzle capillaries, the cross-sectional shape of the nozzle capillaries, and the ratio of capillary length to capillary diameter, it is advisable to use a mold plate produced in the manner illustrated in FIGS. 5 to 8. In FIG. 5, reference numeral 51 identifies a further galvanic electrode which is provided with channels such as funnel-shaped preliminary portions 52 at the positions intended for the nozzle capillaries. These preliminary portions 52 are closed by means of an easily removable filler material 53 so that they form a flush surface. The numeral 54 indicates a layer of a material whose characteristics are changed by high energy radiation (resist material). Layer 54 is connected with galvanic electrode 51. Negatives 61 (FIG. 6) of the mold channels are produced by irradiating the resist layer 54 in a predetermined pattern using high energy radiation 55, and thereafter selectively removing portions of layer 54 by a development treatment which utilizes the differences in material characteristics produced by the radiation. Negatives 61 are in communication with galvanic electrode 51 via filler material 53. In a galvanic bath, a further galvanic layer 71 is produced on galvanic electrode 51 so as to flushly enclose the negatives 62 of the mold channels. Then galvanic layer 71 is leveled, negatives 61 are removed, and filler material 53 of galvanic electrode 51 is removed. What remains is a mold plate 81 having mold channels 82 with preliminary portions 52 and final portions 83 (FIG. 8).

An electrically conductive as well as an electrically insulating material can be used as the filler material 53. With an electrically conductive filler material, a relatively sharp transition results between portions 52 and 83. With an electrically insulating filler material, a rounded transition is attained. A rounded transition is generally favorable in practical use, particularly if the smallest diameter of the preliminary portions 52 is selected to be noticeably larger than the diameter of the final portions 83.

Corpuscular radiation as well as electromagnetic waves, particularly X-ray radiation generated by an electron synchrotron (synchrotron radiation), are suitable as the high energy radiation. A mask may be employed to produce the predetermined pattern if electromagnetic waves are used. If corpuscular radiation is employed, the predetermined pattern can also be produced by electromagnetic control.

Figure 9:
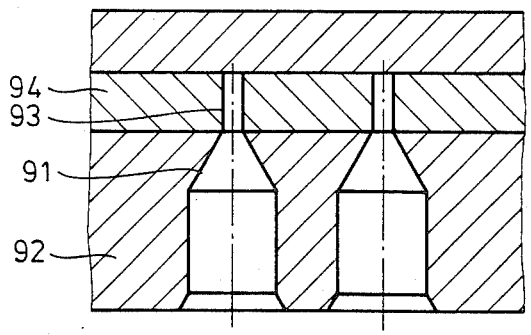
FIG. 9 is a cross-sectional view of a mold plate sandwiched between a cover plate and galvanic electrode, the channels in the mold plate and galvanic electrode being configured differently than in FIG. 1.

In some cases, e.g. if the capillary region of the spinning nozzle plate is to be manufactured of a noble metal, it may be advisable to accommodate the funnel-shaped preliminary portions 91 in a galvanic electrode 92. This is a modification of FIG. 1 which is shown in FIG. 9. Then the mold plate 94 need contain only mold channels 93 which have uniform cross sections, without enlarged bottom portions as in FIG. 1. In this situation the further galvanic electrode lacks preliminary channels and may be completely removed.

In FIGS. 1 to 4, mold plate 12 may be made of nickel. The galvanic electrode 14 is made of stainless steel, as is cover plate 15. A seal between mold plate 12 and cover plate 15 and galvanic electrode 14 is assured by precision machining of the respective surfaces. A non-crosslinking casting resin based on methacrylate ("Plexit M 60," made by Röhm GmbH, Darmstadt, Federal Republic of Germany) is employed as molding material 22 to which is added an internal separating agent ("PAT-665," made by Würtz GmbH & Co KG, Bingen, Federal Republic of Germany) so as to reduce adhesion on the mold surfaces. Galvanic layer 31 is produced by depositing nickel on galvanic electrode 14 in a nickel sulfamate bath which is free of chloride. Galvanic layer 31 is levelled by polish-milling. Negatives 21 as well as the remaining molding material 22 are removed mechanically from galvanic layer 31 and galvanic electrode 14, respectively; any remaining residues may be dissolved with dichloromethane in a subsequent cleaning step.

If galvanic electrode 14 is to be decomposed after spinning nozzle plate 41 has been manufactured, copper is used for electrode 14 and is selectively removed in an alkali etching bath. The destruction-free removal of galvanic electrode 14 is facilitated by the application of a thin copper layer or galvanic electrode 14. This copper layer is likewise selectively decomposed in an alkali etching bath.

To produce a mold plate in the manner illustrated by FIGS. 5–8, high-grade steel (material No. 1.4301) may be used for the further galvanic electrode 51. The funnel-shaped preliminary portions 52 in galvanic electrode 51 are sealed with an epoxy resin mass to form a flush surface. In order to reduce adhesion on the surfaces of preliminary channels 52, an internal separating agent is added to the epoxy resin mass so that, in a later step, filler material 53 can easily be removed mechanically from preliminary channels 52 by way of an auxiliary plate (not illustrated) which has projections (not illustrated) that are positioned to expel the filler material 53. Resist layer 54 is produced by pouring on a methacrylate based casting resin ("Plexit 74," made by Röhm GmbH, Darmstadt, Federal Republic of Germany) which subsequently hardens. To increase adhesion of PMMA resist layer 54, the surface of galvanic electrode 51 is roughened, before application of the casting resin, by sandblasting it with corundum having an average grain size of 10 μm. The irradiation of resist layer 54 is effected through an X-ray mask by means of synchrotron radiation 55 having a characteristic wavelength $\lambda_c = 0.2$ nm, which is in the X-ray range. The X-ray mask is composed of a mask substrate of beryllium (which is substantially transmissive for synchrotron radiation and which has a thickness of about 20 μm) and an absorber of gold (which is substantially nontransmissive for X-rays and which has a thickness of about 15 μm). The selective removal of the irradiated resist material is effected in a known manner by means of a liquid developer. Galvanic layer 71 is produced by depositing nickel on galvanic electrode 51 in a nickel sulfamate bath which is free of chloride. Galvanic layer 71 is leveled by polish-milling. Renewed irradiation with synchrotron radiation and subsequent development removes negatives 61. As already described, filler material 53 is removed mechanically from preliminary portions 52 of galvanic electrode 51.

It will be understood that the above description of the present invention is susceptible to various modifications, changes and adaptations, and the same are intended to be comprehended within the meaning and range of equivalents of the appended claims.

What we claim is:

1. A method for producing a spinning nozzle plate having spinning nozzle channels, comprising the steps of:
    (a) connecting a mold plate having mold channels that correspond to the spinning nozzle channels to a galvanic electrode having feed channels so that the mold channels communicate with the feed channels;
    (b) producing negatives of the spinning nozzle channels by filling the mold channels and the feed channels with an electrically insulating molding material and subsequently removing the mold plate, leaving the negatives connected to the galvanic electrode;
    (c) producing a galvanic layer which encloses the negatives of the spinning nozzle channels; and
    (d) removing the negatives and the remaining molding material from the galvanic layer and galvanic electrode, respectively.

2. The method of claim 1, further comprising the step of leveling the galvanic layer.

3. The method of claim 1, comprising initially producing the mold plate by the steps of:
    (e) depositing a layer of resist material on a further galvanic electrode, the resist material having characteristics which are changed by high-energy radiation;
    (f) producing negatives of the mold channels on the further galvanic electrode by irradiating the layer of resist material in a predetermined pattern and thereafter selectively removing resist material while utilizing the differences in the characteristics thereof produced by the irradiation;
    (g) producing a further galvanic layer which encloses the negatives of the mold channels on the further galvanic electrode; and
    (h) removing the negatives of the mold channels.

4. The method of claim 3, further comprising the step of leveling the further galvanic layer while producing the mold plate.

5. The method of claim 3, further comprising the step of removing at least part of the further galvanic electrode while producing the mold plate.

6. A spinning nozzle plate made by the method of claim 3, wherein at least one nozzle capillary has an elongated portion with a longitudinal axis, said elongated portion having a capillary wall that is spaced apart from the longitudinal axis by a distance that does not exceed 30 μm.

* * * * *